(12) United States Patent
Branyon

(10) Patent No.: US 10,281,050 B2
(45) Date of Patent: May 7, 2019

(54) ONE-WAY VALVE SCORE DESIGN

(71) Applicant: Sonoco Development, Inc., Hartsville, SC (US)

(72) Inventor: Jacob Donald Prue Branyon, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 111 days.

(21) Appl. No.: 15/474,557

(22) Filed: Mar. 30, 2017

(65) Prior Publication Data

US 2017/0307091 A1    Oct. 26, 2017

Related U.S. Application Data

(60) Provisional application No. 62/327,539, filed on Apr. 26, 2016.

(51) Int. Cl.
*F16K 15/14* (2006.01)
*B29C 65/48* (2006.01)
*B29C 65/74* (2006.01)
*B29C 65/00* (2006.01)
*B65D 33/01* (2006.01)
*B65D 77/22* (2006.01)
*B29L 31/00* (2006.01)

(52) U.S. Cl.
CPC ............ *F16K 15/147* (2013.01); *B29C 65/48* (2013.01); *B29C 65/74* (2013.01); *B29C 66/43* (2013.01); *B65D 33/01* (2013.01); *B65D 77/225* (2013.01); *B29L 2031/7128* (2013.01)

(58) Field of Classification Search
CPC combination set(s) only.
See application file for complete search history.

(56) References Cited

U.S. PATENT DOCUMENTS

| | | |
|---|---|---|
| 4,134,535 A | 1/1979 | Barthels et al. |
| 4,206,870 A | 6/1980 | DeVries |
| 5,553,942 A | 9/1996 | Domke et al. |
| 6,182,850 B1 | 2/2001 | Marbler et al. |
| 6,733,803 B1 | 5/2004 | Vidkjaer |
| 7,169,419 B2 | 1/2007 | Dalton et al. |

(Continued)

FOREIGN PATENT DOCUMENTS

| | | |
|---|---|---|
| AU | 51096 | 8/1970 |
| WO | 2012086295 A1 | 6/2012 |

(Continued)

*Primary Examiner* — P. Macade Nichols
(74) *Attorney, Agent, or Firm* — Miller, Matthias & Hull LLP

(57) ABSTRACT

In flexible package, a one-way valve may include a substrate forming a portion of the flexible package and having at least one inlet score, a top sheet having at least one outlet score and secured thereto by an adhesive to define a valve chamber in which the substrate and the top sheet are not permanently adhered to each other, and a liquid film within the valve chamber and adhering the top sheet to the substrate within the valve chamber until a pressure differential exists causing gases to pass through the one-way valve. The inlet scores and the outlet scores may be non-linear, or may be linear scores that are not parallel to each other to prevent the scores from collapsing on themselves and preventing gas flow when the package buckles.

10 Claims, 3 Drawing Sheets

(56) References Cited

U.S. PATENT DOCUMENTS

| | | |
|---|---|---|
| 7,490,623 B2 | 2/2009 | Rypstra |
| 7,527,840 B2 | 5/2009 | Zeik |
| 7,596,931 B2 | 10/2009 | Gunter et al. |
| 7,874,731 B2 | 1/2011 | Turvey et al. |
| 7,892,390 B2 | 2/2011 | Zeik |
| 8,152,016 B2 | 4/2012 | Berndt et al. |
| 8,197,138 B2 | 6/2012 | Turvey |
| 8,197,139 B2 | 6/2012 | Turvey et al. |
| 8,557,359 B2 | 10/2013 | Yang et al. |
| 9,446,893 B2 | 9/2016 | Haimi |
| 2006/0096982 A1* | 5/2006 | Gunter .................. B65B 7/2878 220/89.1 |
| 2008/0260917 A1* | 10/2008 | Sankey .................... B32B 3/10 426/114 |
| 2009/0029082 A1 | 1/2009 | Remmele et al. |
| 2011/0284536 A1 | 11/2011 | Walters |
| 2015/0298442 A1 | 10/2015 | Morin |

FOREIGN PATENT DOCUMENTS

| | | |
|---|---|---|
| WO | 2014055736 A1 | 4/2014 |
| WO | 2015111015 A1 | 7/2015 |

\* cited by examiner

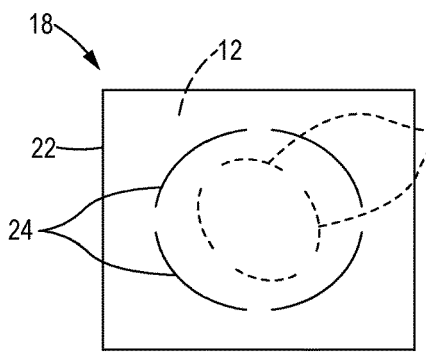
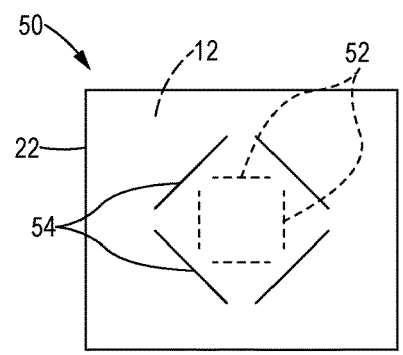
FIG. 5  FIG. 6
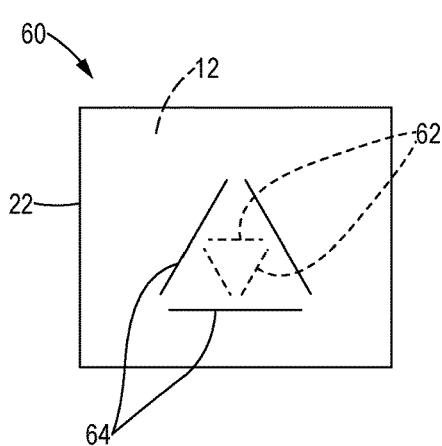
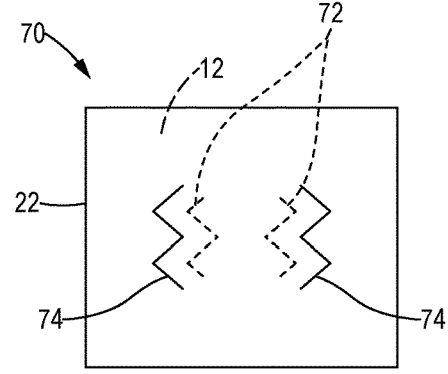
FIG. 7  FIG. 8
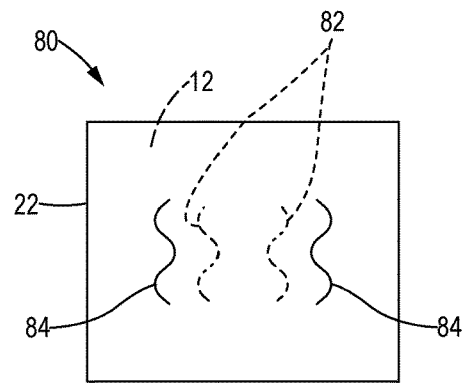
FIG. 9

ONE-WAY VALVE SCORE DESIGN

BACKGROUND OF THE INVENTION

Field of the Invention

This disclosure relates to packaging for products that tend to release gasses after filling and sealing. More particularly, this disclosure relates to flexible one-way gas release valve integrated into a lamination and attached to a packaging wall or a peelable seal.

Description of the Related Art

It is common in the marketplace to package products, and in particular food products, in flexible packaging containers. The food product may be deposited into an unsealed portion of the package, and then the package is sealed to maintain the food product within the interior of the package and isolate the food product from the ambient atmosphere surrounding the flexible package. For some food products, it may be desirable to reduce the gas present in the package at the time the flexible package is sealed to reduce the exposure of the food product to oxygen and maintain its freshness until a consumer opens the package.

Some food products stored in flexible packaging in this way may continue to release gasses after the package is sealed. For example, fresh roasted coffee goes through an "off-gassing" period that lasts 3-10 hours after the roast during which gas pressure created inside the beans during the roast are slowly released as the gas permeates through the shells. If the coffee is packaged during the off-gassing period, the gas released by the beans will increase the pressure within the flexible packaging. The increased pressure can create a pressure differential with the ambient atmosphere surrounding the package that could cause the packaging material or the seals to burst and compromise the integrity of the flexible package and expose the food product, namely the coffee, to the ambient atmosphere.

To release the gases and alleviate the corresponding pressure buildup within the flexible packaging, one-way valves may be integrated into the packaging material. The packaging material may be a lamination that typically comprises a top layer and a bottom layer adhered together by an adhesive, except in the area of a valve chamber of the one-way valve. Usually, the one-way valves require a film or lubricant in the valve chamber to increase adhesion between the laminate layers, thereby preventing gas from entering or exiting the container until the pressure in the interior of the flexible packaging creates a sufficient pressure differential with the ambient atmosphere. When a minimum pressure differential is reached, the pressure from the interior overcomes the adhesiveness of the film or lubricant in the valve chamber to allow the gas to escape from the flexible packaging until the internal pressure is reduced and the pressure differential drops below the minimum required to open the one-way valve.

An example of such a one-way valve is disclosed in U.S. Pat. No. 7,527,840 issued to Zeik on May 5, 2009, entitled "Flexible Laminate Having an Integrated Pressure Release Valve" (hereinafter "the Zeik patent"). The Zeik patent discloses a one-way valve in which a first lamina has an inlet channel in fluid communication with an interior of a container, a second lamina has an outlet channel in fluid communication with the ambient atmosphere surrounding the container, and a liquid film separates the first and second lamina in a valve region. The liquid film prevents external air from entering the valve region while allowing gas within the container to escape through the valve region when a sufficient pressure differential exists between the interior and the exterior of the container.

BRIEF SUMMARY OF THE DISCLOSURE

In one aspect of the present disclosure, a one-way valve for a flexible package is disclosed. The one-way valve may include a substrate forming a portion of the flexible package and having at least one inlet score, a top sheet having at least one outlet score, an adhesive disposed between the substrate and the top sheet and adhering the top sheet to the substrate. The substrate, the top sheet and the adhesive define a valve chamber in which the substrate and the top sheet are not permanently adhered to each other, and the at least one inlet score fluidly connects an interior of the flexible package to the valve chamber and the at least one outlet score fluidly connects the valve chamber to an ambient atmosphere surrounding the flexible package. The one-way valve may further include a liquid film occupying at least a portion of the valve chamber and adhering the top sheet to the substrate within the valve chamber to prevent gas within the flexible package from passing through the one-way valve when a pressure differential between an internal pressure of the flexible package and an ambient air pressure is less than a minimum gas release pressure differential. The at least one inlet score is not a single linear inlet score and is not a plurality of linear inlet scores that are parallel to each other, and the at least one outlet score is not a single linear outlet score and is not a plurality of linear outlet scores that are parallel to each other.

In another aspect of the present disclosure, a method of producing a one-way valve for a flexible package is disclosed. The method may include forming at least one inlet score on a substrate of the flexible package and forming at least one outlet score on a top sheet of the one-way valve, wherein the at least one inlet score is not a single linear inlet score and is not a plurality of linear inlet scores that are parallel to each other, and the at least one outlet score is not a single linear outlet score and is not a plurality of linear outlet scores that are parallel to each other. The method may further include applying an adhesive to a substrate outer surface of the substrate that defines a boundary around the at least one inlet score, wherein the substrate, the top sheet and the adhesive define a valve chamber in which the substrate and the top sheet are not permanently adhered to each other, and the at least one inlet score fluidly connects an interior of the flexible package to the valve chamber and the at least one outlet score fluidly connects the valve chamber to an ambient atmosphere surrounding the flexible package. The method may also include applying a liquid film to at least a portion of the substrate outer surface within the boundary defined by the adhesive to adhere the top sheet to the substrate within the valve chamber to prevent gas within the flexible package from passing through the one-way valve when a pressure differential between an internal pressure of the flexible package and an ambient air pressure is less than a minimum gas release pressure differential.

Additional aspects are defined by the claims of this patent.

BRIEF DESCRIPTION OF THE DRAWINGS

FIG. 5 is a front view of the one-way valve of the flexible package of FIG. 1 having arc-shaped inlet scores and outlet scores;

FIG. 6 is a front view of the one-way valve of the flexible package of FIG. 1 having linear inlet scores and outlet scores arranged in squares;

FIG. 7 is a front view of the one-way valve of the flexible package of FIG. 1 having linear inlet scores and outlet scores arranged in triangles;

FIG. 8 is a front view of the one-way valve of the flexible package of FIG. 1 having zigzag-shaped inlet scores and outlet scores; and FIG. 9 is a front view of the one-way valve of the flexible package of FIG. 1 having serpentine-shaped inlet scores and outlet scores.

DETAILED DESCRIPTION

Figure 1:
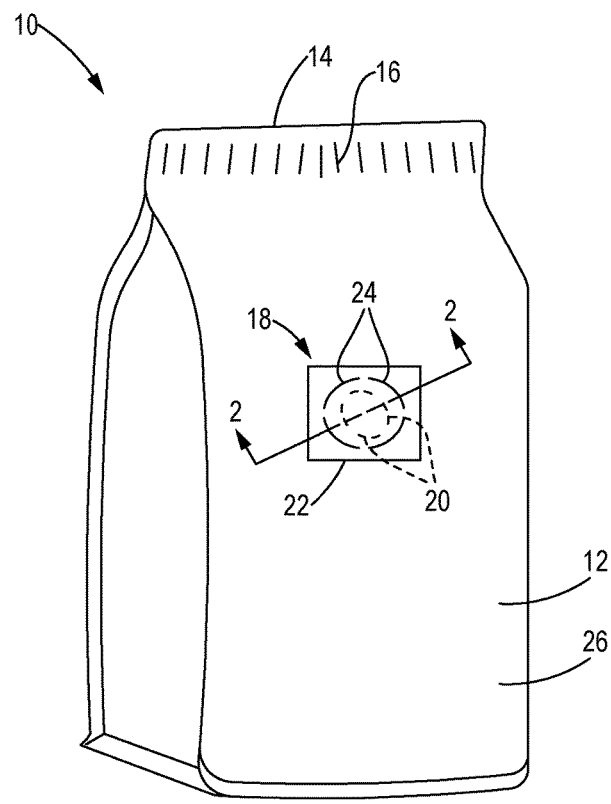
FIG. 1 is an isometric view of a flexible package having a one-way valve in accordance with the present disclosure.

FIG. 1 illustrates an exemplary flexible package 10 that may contain a food product (not shown), such as roasted coffee. The flexible package 10 may be formed from a single layer or multi-layer polymeric sheet or laminate substrate 12 that is folded and sealed to isolate an interior of the flexible package 10 and the food product enclosed therein from an ambient atmosphere surrounding the flexible package 10. The flexible package 10 may be partially formed and closed while leaving an opening at top edge 14 to allow the food product to be deposited into the flexible package 10. After the food product is deposited, a seal 16 may be formed at the top edge 14 to segregate the interior of the flexible package 10 from the exterior. Of course, other methods and sequences for forming and closing the flexible package 10 and depositing the food product therein will be apparent to those skilled in the art and are contemplated by the inventor.

As discussed above, some food products such as roasted coffee may release gases after being sealed in the flexible package 10 such that an internal pressure within the flexible package 10 may increase over time. In order to release the gas and reduce the internal pressure before the substrate 12, the seal 16 and/or other seals (not shown) of the flexible package rupture, the flexible package 10 is provided with a one-way valve 18 that may allow the gases to escape from the interior of the flexible package 10 while preventing air, and in particular oxygen, from the ambient atmosphere from entering the interior of the flexible package 10. The one-way valve 18 may be formed by providing one or more inlet scores 20 through the substrate 12, and affixing a top sheet 22 having one or more outlet scores 24 to a substrate outer surface 26 of the substrate 12 in a position that overlays the inlet scores 20.

Figure 2:
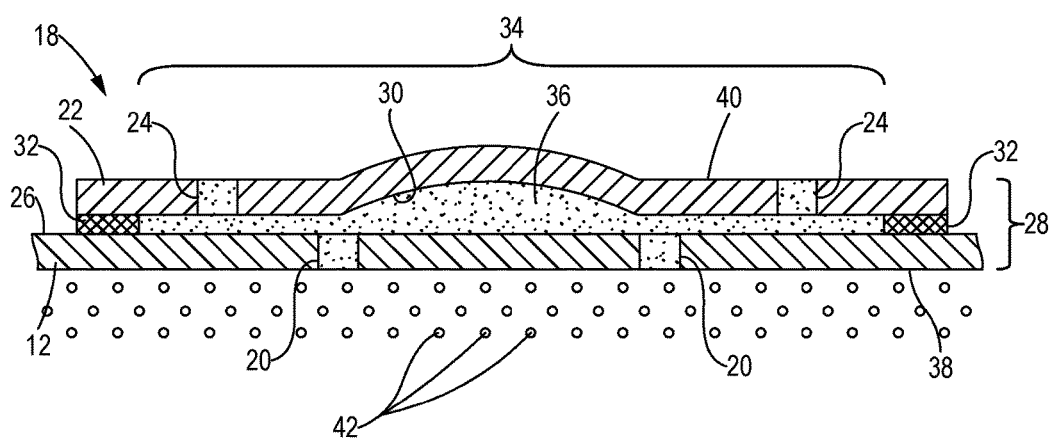
FIG. 2 is a partial cross-sectional view taken through line 2-2 of FIG. 1 of a portion of the flexible package including a valve chamber of the one-way valve.

The cross-sectional view of FIG. 2 illustrates the one-way valve 18 of the flexible package 10 in greater detail. The top sheet 22 and a corresponding portion of the substrate 12 may combine to form a laminate 28. As discussed above, the substrate 12 may be a single layer or multiple layers of laminated material. The substrate 12 may be formed from an organic polymer sheet material or materials such as polyolefin, polyamides, polyesters, polycarbonates, high density polyethylene (HDPE), polyvinyl chloride (PVC), ethylene vinyl alcohol (EVOH), polyvinyl alcohol (PVOH), polyvinylidene chloride (PVDC), and the like and combinations thereof. In addition to the organic polymer sheet(s), the substrate 12 may include a metallized polymer film such as metallized polyethylene terephthalate laminated on the interior of the substrate 12 and in direct contact with the food product enclosed therein. The top sheet 22 may similarly be formed from one or more layers of organic polymer sheets, with the polymer sheets being transparent in some implementations to allow product and packaging information to be printed on a top sheet inner surface 30.

The top sheet 22 is adhered to the substrate outer surface 26 of the substrate 12 by an adhesive 32 such as a permanent adhesive that will maintain the top sheet 22 affixed to the substrate outer surface 26 within a range of pressure differentials to which the one-way valve 18 will be exposed based on the expected internal pressures and ambient pressures. The adhesive 32 defines a boundary around the inlet scores 20 and the outlet scores 24, and the substrate outer surface 26, the top sheet inner surface 30 and the adhesive 32 combine to define a the valve chamber 34 of the one-way valve 18. The valve chamber 34 is an area in which the substrate outer surface 26 and the top sheet inner surface 30 are not permanently adhered to each other. Instead, a liquid film 36 occupies some or all of the valve chamber 34 between the substrate outer surface 26 and the top sheet inner surface 30, and in particular the area between the inlet scores 20 and the outlet scores 24. The liquid film 36 helps the top sheet 22 adhere to the substrate 12 in the region corresponding to the valve chamber 34, and may be a lubricant that does not dry or harden over the useful life of the flexible package 10. The liquid film 36 may be silicon oil, hydrocarbon oil, glycerin, polyhydric alcohol (polyol), water or other appropriate lubricant that may temporarily yield when a predetermined opening pressure differential exists between the interior pressure and the ambient pressure surrounding the flexible package 10.

The inlet scores 20 may be formed in the substrate 12 by laser scoring, mechanical puncturing or other appropriate methods for forming channels through the substrate 12 that place a substrate inner surface 38 and the interior of the flexible package 10 in fluid communication with the substrate outer surface 26 and the valve chamber 34. The outlet scores 24 may be formed in a similar manner in the top sheet 22 to place the top sheet inner surface 30 and the valve chamber 34 in fluid communication with a top sheet outer surface 40 and the ambient atmosphere surrounding the flexible package 10. The inlet scores 20 through the substrate 12 and the outlet scores 24 through the top sheet 22 are preferably offset and not aligned in a direction orthogonal to a plane defined by the laminate 28. The liquid film 36 occupies enough of the valve chamber 34 to prevent air from the ambient atmosphere surrounding the flexible package 10 from entering the flexible package 10 through the one-way valve 18. The liquid film 36 also enhances the adhesiveness of the top sheet 22 to the substrate 12 in the area of the valve chamber 34 so that gas 42 emitted by the food product inside the container does not escape until the internal pressure creates a pressure differential with ambient air pressure that exceeds a minimum gas release pressure differential. Exceeding the minimum gas release pressure differential will cause the liquid film 36 to temporarily yield and release at least a portion of the gas 42 until the internal pressure is released and the pressure differential is below the minimum gas release pressure differential.

Figure 3:
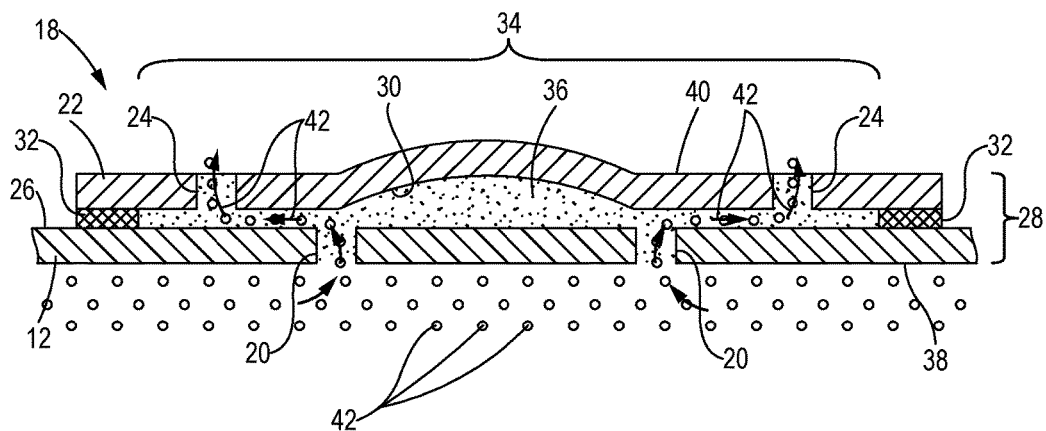
FIG. 3 is the partial cross-sectional view of FIG. 2 with gas exiting an interior of the flexible package through the one-way valve.

FIG. 3 shows the one-way valve 18 when the minimum gas release pressure differential is exceeded and the gas 42 flows out of the flexible package 10 through the one-way valve 18. The gas 42 released by the food product inside the flexible package 10 has achieved a pressure sufficient to overcome the ambient air pressure and the adhesiveness of liquid film 36 between the substrate 12 and the top sheet 22 to create one or more pressure relief channels through the liquid film 36. The flow of the gas 42 through the pressure relief channels is indicated by the unnumbered arrows in FIG. 3. The gas 42 will continue to flow out of the one-way valve 18 until the internal pressure is reduced sufficiently to drop the pressure differential below the minimum gas release pressure differential. At that point, the liquid film 36 will re-adhere the top sheet 22 to the substrate 12 within the valve chamber 34 to prevent further release of the gas 42 from the flexible package 10.

Figure 4:
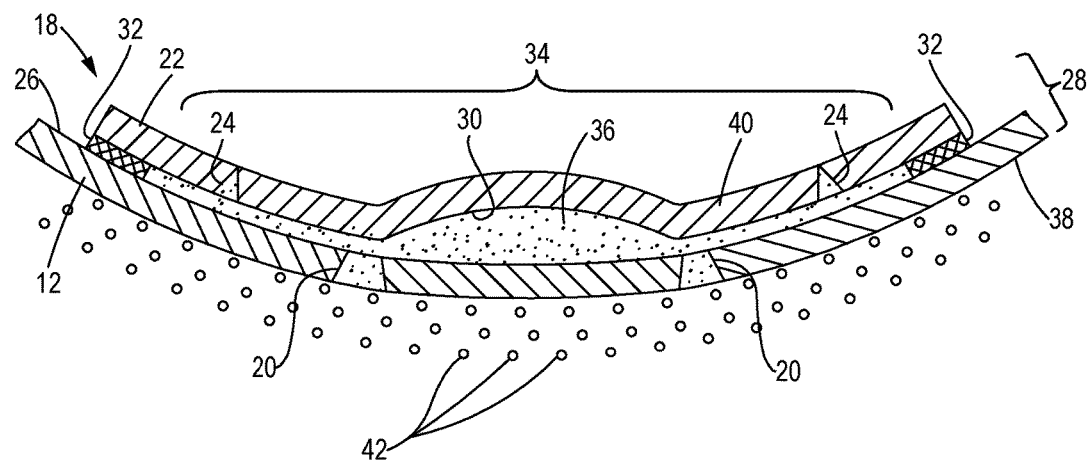
FIG. 4 is the partial cross-sectional view of FIG. 2 with the portion of the flexible package and the one-way valve buckled inward.

As long as the substrate 12 of the flexible package 10 is relatively flat as shown in FIGS. 2 and 3, the inlet scores 20 and the outlet scores 24 provide channels sufficiently large for the flow of gas 42 through the one-way valve 18. However, due to the inherent nature of flexible packaging, the substrate 12 can flex, bend and buckle when forces are applied to the flexible package 10. Such buckling is illustrated in FIG. 4. When the substrate 12 and the top sheet 22 buckle and deform in the area of the valve chamber 34, the inlet scores 20 and the outlet scores 24 can close on themselves, similar to a door hinge. The dimensions of the scores 20, 24 and other components are exaggerated for clarity of illustration, but the inlet scores 20 may be partially closed and the outlet scores 24 may be completely closed. This partial or complete closure of the scores 20, 24 can limit or completely cut off the ability for the gas 42 to flow through the one-way valve 18. Current integrated one-way valves use linear scores in the substrate 12 and/or the top sheet 22, and multiple linear scores that are parallel to each other. With these configurations, it is possible for the flexible package 10 to buckle in a manner that substantially closes all the linear scores and prevents any gas 42 from passing through the one-way valve 18.

In one-way valves 18 in accordance with the present disclosure, the inlet scores 20 are not formed as either a single linear inlet score or as a plurality of linear inlet scores that are aligned parallel to each other. Similarly, the outlet scores 24 are not a single linear outlet score or a plurality of parallel linear outlet scores. Instead, the inlet scores 20 and the outlet scores 24 are provided as individual scores that cannot close on themselves along the entire length of the scores. Alternatively or in addition, multiple scores may be provided such that not all of the scores can close on themselves at the same time. With these configurations in accordance with the present disclosure, flow paths for the gas 42 through the one-way valve 18 are maintained at all times.

FIG. 5 illustrates the configurations of the inlet scores 20 and the outlet scores 24 of the one-way valve 18 in greater detail. By using a circular or arc-shaped non-linear shape, the scores 20, 24 cannot close on themselves along their entire length. In the illustrated embodiment, four arc-shaped inlet scores 20 are provided in the substrate 12 in an inlet score circular pattern. Four arc-shaped outlet scores 24 are formed in the top sheet 22 in an outlet score circular pattern having a larger diameter than a diameter of the inlet score circular pattern. As shown, the inlet score circular pattern is rotated approximately 45° relative to the outlet score circular pattern, but the relative positions of the circular patterns may be varied as necessary to ensure the requisite amount of flow of gas 42 through the one-way valve 18.

Those skilled in the art will understand that the circular patterns may be varied in other ways to achieve desired performance characteristics of the one-way valve 18. In addition to the positioning, the radii of the scores 20, 24 may be increased or decreased to vary the relative sizes of the circular patterns as necessary to dictate the minimum gas release pressure differential at which the one-way valve 18 will open and release the gas 42. The arc-shaped scores 20, 24 may be provided with other curved but noncircular shapes such as elliptical, parabolic or other more complex curvatures. Additionally, each circular pattern may include more or fewer than the four scores 20, 24 is illustrated, but providing multiple scores 20, 24 in each circular pattern can create redundancy in the one-way valve 18 that can more reliably ensure the flow paths are maintained for gas 42 as the flexible package 10 buckles in various ways during use.

Other variations in the numbers, geometries and relative orientations of the scores 20, 24 are contemplated by the inventor. For example, FIG. 6 illustrates an alternative embodiment of a one-way valve 50 having four linear inlet scores 52 arranged in an inlet score square pattern, and four linear outlet scores 54 arranged in an outlet score square pattern. The inlet score square pattern is smaller than the outlet score square pattern, and the square patterns are rotated approximately 45° with respect to each other. The linear scores 52, 54 and the square patterns may have larger or smaller relative sizes as necessary, and the square patterns may have different relative orientations. By providing a plurality of linear scores 52, 54 that are not parallel to each other, some of the linear scores 52, 54 may close on themselves when the flexible package 10 buckles and deforms, while others of the linear scores 52, 54 will deform in different ways that do not close the linear scores 52, 54 and allow the gas 42 to flow through the one-way valve 50.

The square patterns discussed above are one example of providing a plurality of nonparallel linear scores in a one-way valve to ensure flow of gas 42 through the valve. FIG. 7 illustrates another alternative embodiment wherein a one-way valve 60 includes three linear inlet scores 62 arranged in an inlet score triangle pattern, and three linear outlet scores 64 arranged in an outlet score triangle pattern. The inlet score triangle pattern is smaller than the outlet score triangle pattern, and the triangle patterns are rotated approximately 60° with respect to each other. The linear scores 62, 64 and the triangle patterns may have larger or smaller relative sizes as necessary, and the triangle patterns may have different relative orientations. The linear scores 62, 64 will respond to deformations and buckling of the flexible package 10 in a similar way as the linear scores 52, 54 described above where some may collapse and close while others remain open to provide flow passages for the gas 42. In further alternative embodiments, more or fewer linear scores may be provided in the one-way valves 50, 60 and arranged in other geometric patterns that will ensure constant flow through the one-way valve.

FIGS. 8 and 9 provide examples of one-way valves having non-linear scores that will not close along their entire length when the flexible package 10 is deformed. FIG. 8 illustrates a one-way valve 70 having zigzag-shaped inlet scores 72 formed in the substrate 12 and zigzag-shaped outlet scores 74 formed in the top sheet 22. The zigzag-shaped scores 72, 74 are formed by series of linear segments that are not parallel to each other such that portion of the zigzag-shaped scores 72, 74 may collapse and close when the flexible package 10 buckles while other portions of the zigzag-shaped scores 72, 74 will remain open for gas flow.

In FIG. 9, a one-way valve 80 includes serpentine-shaped inlet scores 82 formed in the substrate 12 and serpentine-shaped outlet scores 84 formed in the top sheet 22. The changes in direction in the serpentine-shaped scores 82, 84 ensure that portions of the serpentine-shaped scores 82, 84 will be open when the flexible package 10 deforms and buckles in a similar manner as the segments in the zigzag-shaped scores 72, 74 having different orientations.

INDUSTRIAL APPLICABILITY

The one-way valves 18, 50, 60, 70, 80 in accordance with the present disclosure may serve to protect the flexible package 10 from over pressurization in the interior by ensuring continuous paths for the flow of gas 42 from the interior of the flexible package 10 to the ambient atmosphere surrounding the flexible package 10. The illustrated embodiments are exemplary only, and other variations are contemplated where the substrate 12 and the top sheet 22 do not have either a single linear score or a plurality of linear scores that are arranged parallel to each other. For example, the inlet scores and the outlet scores of the one-way valves do not have to be of similar geometries or configurations such as matching circular, square or triangular shapes. Consequently, the inlet scores may be serpentine-shaped and the outer scores may be arc-shaped and arranged in a circular pattern in a particular implementation of a one-way valve. Other combinations of variations are contemplated so long as the necessary operation of the one-way valve is achieved when the flexible package buckles and deforms.

The flexible package 10 formed from the folded and sealed substrate 12 is exemplary of flexible containers in which one-way valves in accordance with the present disclosure may be implemented. The one-way valve may also be useful in rigid plastic or metal containers for food products such as coffee having a flexible peelable membrane seal adhered to a rim surrounding an open end of the container. Inlet scores in accordance with the present disclosure may be formed in the membrane seal that will act as a substrate. A top sheet having outlet scores in accordance with the present disclosure may be affixed to the membrane seal with an adhesive, and a liquid film may be deposited there between to form the one-way valve that will allow gas to escape from the container.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A one-way valve for a flexible package, the one way valve comprising:

a substrate forming a portion of the flexible package and having at least one inlet score;

a top sheet having at least one outlet score;

an adhesive disposed between the substrate and the top sheet and adhering the top sheet to the substrate, wherein the substrate, the top sheet and the adhesive define a valve chamber in which the substrate and the top sheet are not permanently adhered to each other, wherein the at least one inlet score fluidly connects an interior of the flexible package to the valve chamber and the at least one outlet score fluidly connects the valve chamber to an ambient atmosphere surrounding the flexible package; and a liquid film occupying at least a portion of the valve chamber and adhering the top sheet to the substrate within the valve chamber to prevent gas within the flexible package from passing through the one-way valve when a pressure differential between an internal pressure of the flexible package and an ambient air pressure is less than a minimum gas release pressure differential, wherein the at least one outlet score comprises a plurality of arc-shaped outlet scores arranged in an outlet score circular pattern and the at least one inlet score comprises a plurality of arc-shaped inlet scores arranged in an inlet score circular pattern; and the inlet score circular pattern is rotated 45° relative to the outlet score circular pattern.

2. The one-way valve of claim 1, wherein the plurality of arc-shaped outlet scores comprises four arc-shaped outlet scores and the plurality of arc-shaped inlet scores comprises four arc-shaped inlet scores.

3. A one-way valve for a flexible package, the one-way valve comprising:

a substrate forming a portion of the flexible package and having at least one inlet score:

a top sheet having at least one outlet score;

an adhesive disposed between the substrate and the top sheet and adhering the top sheet to the substrate, wherein the substrate, the top sheet and the adhesive define a valve chamber in which the substrate and the top sheet are not permanently adhered to each other, wherein the at least one inlet score fluidly connects an interior of the flexible package to the valve chamber and the at least one outlet score fluidly connects the valve chamber to an ambient atmosphere surrounding the flexible package; and a liquid film occupying at least a portion of the valve chamber and adhering the top sheet to the substrate within the valve chamber to prevent gas within the flexible package from passing through the one-way valve when a pressure differential between an internal pressure of the flexible package and an ambient air pressure is less than a minimum gas release pressure differential, wherein:

the at least one outlet score comprises four linear outlet scores arranged in an outlet score square pattern;

the at least one inlet score comprises four linear inlet scores arranged in an inlet score square pattern; and the inlet score square pattern is rotated 45° relative to the outlet score square pattern.

4. A one-way valve for a flexible package, the one-way valve comprising:
- a substrate forming a portion of the flexible package and having at least one inlet score:
- a top sheet having at least one outlet score;
- an adhesive disposed between the substrate and the top sheet and adhering the top sheet to the substrate, wherein the substrate, the top sheet and the adhesive define a valve chamber in which the substrate and the top sheet are not permanently adhered to each other, wherein the at least one inlet score fluidly connects an interior of the flexible package to the valve chamber and the at least one outlet score fluidly connects the valve chamber to an ambient atmosphere surrounding the flexible package; and
- a liquid film occupying at least a portion of the valve chamber and adhering the top sheet to the substrate within the valve chamber to prevent gas within the flexible package from passing through the one-way valve when a pressure differential between an internal pressure of the flexible package and an ambient air pressure is less than a minimum gas release pressure differential, wherein:
- the at least one outlet score comprises three linear outlet scores arranged in an outlet score triangle pattern;
- the at least one inlet score comprises three linear inlet scores arranged in an inlet score triangle pattern; and
- the inlet score triangle pattern is rotated 60° relative to the outlet score triangle pattern.

5. A method of producing a one-way valve for a flexible package, comprising:
- forming at least one inlet score on a substrate of the flexible package, wherein the at least one inlet score comprises a plurality of inlet scores arranged in an inlet score pattern;
- forming at least one outlet score on a top sheet of the one-way valve, wherein the at least one outlet score comprises a plurality of outlet scores arranged in an outlet score pattern that is rotated 45° or 60° relative to the inlet score pattern;
- applying an adhesive to an outer surface of the substrate that defines a boundary around the at least one inlet score, wherein the substrate, the top sheet and the adhesive define a valve chamber in which the substrate and the top sheet are not permanently adhered to each other, wherein the at least one inlet score fluidly connects an interior of the flexible package to the valve chamber and the at least one outlet score fluidly connects the valve chamber to an ambient atmosphere surrounding the flexible package; and
- applying a liquid film to at least a portion of the substrate outer surface within the boundary defined by the adhesive to adhere the top sheet to the substrate within the valve chamber to prevent gas within the flexible package from passing through the one-way valve when a pressure differential between an internal pressure of the flexible package and an ambient air pressure is less than a minimum gas release pressure differential.

6. The method of claim 5, wherein forming at least one outlet score comprises forming a plurality of arc-shaped outlet scores arranged in an outlet score circular pattern.

7. The method of claim 5, wherein forming at least one outlet score comprises forming four linear outlet scores arranged in an outlet score square pattern.

8. The method of claim 5, wherein forming at least one outlet score comprises forming three linear outlet scores arranged in an outlet score triangle pattern.

9. The method of claim 5, wherein forming at least one outlet score comprises forming at least one zigzag-shaped outlet score.

10. The method of claim 5, wherein forming at least one outlet score comprises forming at least one serpentine-shaped outlet score.

* * * * *